United States Patent [19]

Le Moigne

[11] Patent Number: 5,295,561

[45] Date of Patent: Mar. 22, 1994

[54] DEVICE FOR AUTOMATICALLY TAKING UP PLAY FOR A BRAKING MECHANISM

[75] Inventor: Daniel Le Moigne, Le Plessis Grammoire, France

[73] Assignee: Bendix Europe Services Techniques, Drancy, France

[21] Appl. No.: 934,397

[22] Filed: Aug. 25, 1992

[30] Foreign Application Priority Data

Sep. 5, 1991 [FR] France ............... 91 11129

[51] Int. Cl.⁵ .............. F16D 71/00; F16D 51/06
[52] U.S. Cl. .............. 188/79.52; 188/79.54; 188/196 BA; 188/196 F
[58] Field of Search ......... 267/79.52, 196 BA, 196 D, 267/196 F, 196 P, 79.51, 79.54

[56] References Cited

U.S. PATENT DOCUMENTS

| | | | |
|---|---|---|---|
| 4,071,123 | 1/1978 | Courbot et al. | 188/196 BA X |
| 4,174,770 | 11/1979 | Courbot | 188/79.54 |
| 4,236,611 | 12/1980 | Claverie | 188/79.54 |
| 4,515,250 | 5/1985 | Spaargaren | 188/79.54 |
| 4,595,085 | 6/1986 | Le Marchand | 188/71.9 |
| 4,706,784 | 11/1987 | Shellhause | 188/196 BA X |

FOREIGN PATENT DOCUMENTS

| | | |
|---|---|---|
| 0003452 | 8/1979 | European Pat. Off. . |
| 2551819 | 3/1985 | European Pat. Off. . |
| 0216478 | 4/1987 | European Pat. Off. . |
| 1540199 | 8/1968 | France . |
| 2392278 | 12/1978 | France . |
| 1460847 | 1/1977 | United Kingdom . |
| 2049077 | 12/1980 | United Kingdom ............ 188/79.52 |

*Primary Examiner*—Andres Kashnikow
*Assistant Examiner*—Kevin D. Rutherford
*Attorney, Agent, or Firm*—Larry J. Palguta; Ken C. Decker

[57] ABSTRACT

Device for automatically taking up the play in a braking mechanism comprising a cylindrical piece (30) rotatably movable about its own axis (x—x'), of which the rotation over a fraction of a revolution is ensured by a control member (41) able to pivot alternatively in one direction and the other, its pivoting taking up the play. The control member acts on said cylindrical piece by the intermediary of a spring-wire (38) rolled around the latter, in such a fashion that when it presses the spring-wire in one direction it engenders its tightening on the cylindrical piece and correspondingly the driving of the latter by friction, while in the other direction it engenders the release of the spring-wire and correspondingly its disengagement with respect to the cylindrical piece, the latter not being driven.

2 Claims, 5 Drawing Sheets

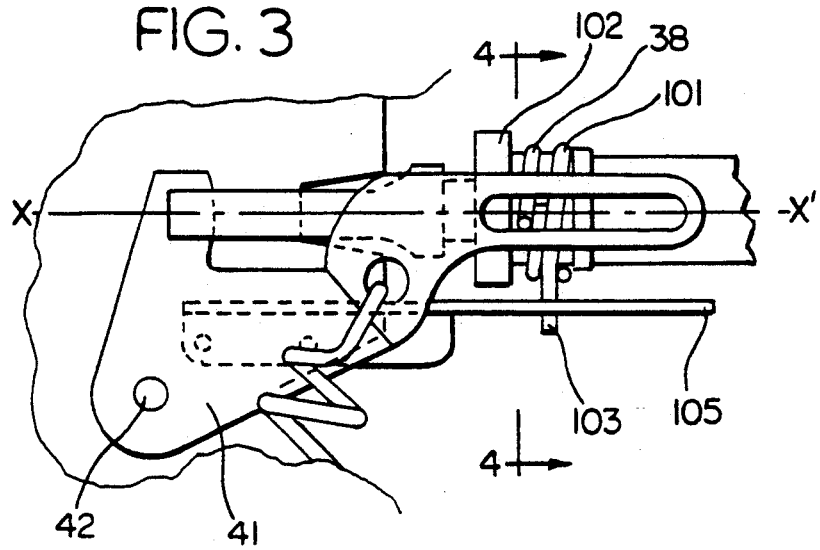
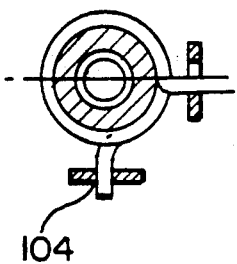
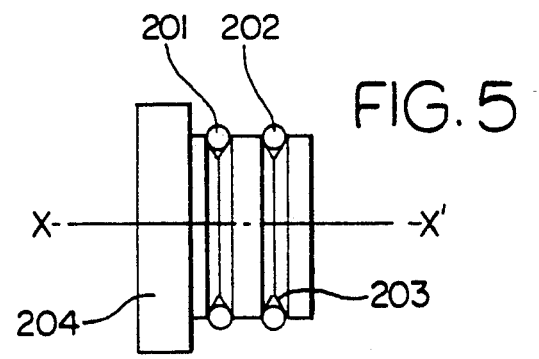
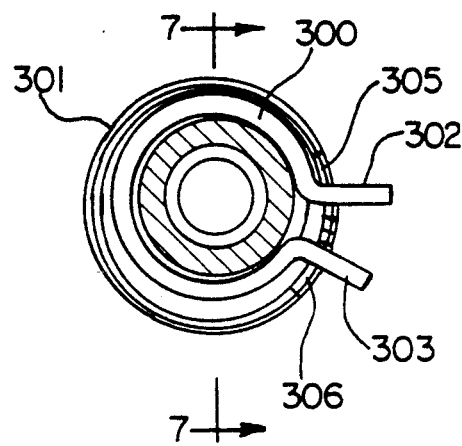
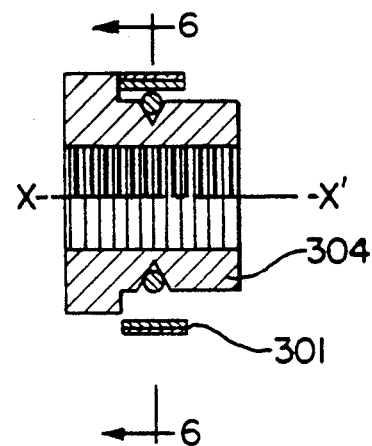

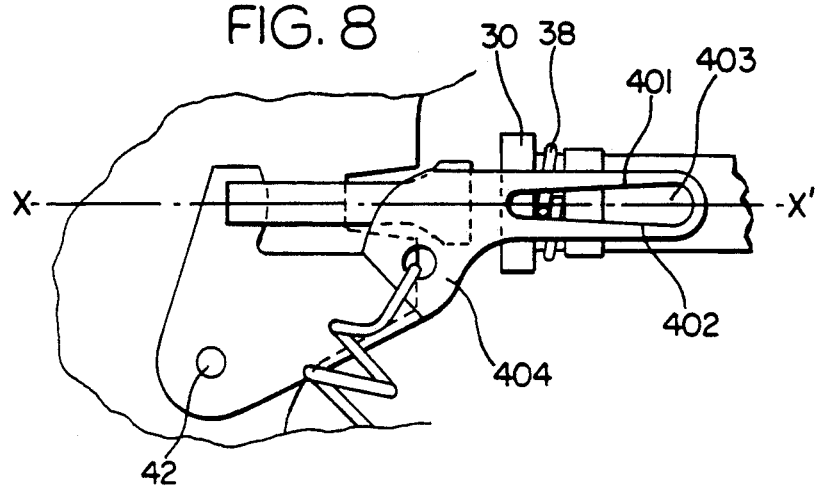
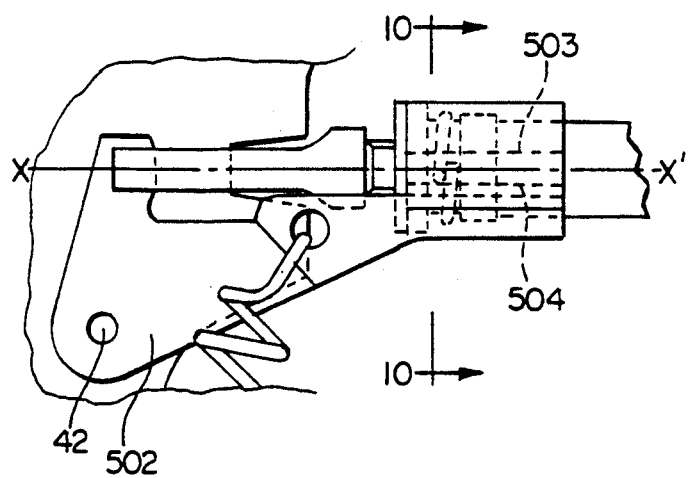
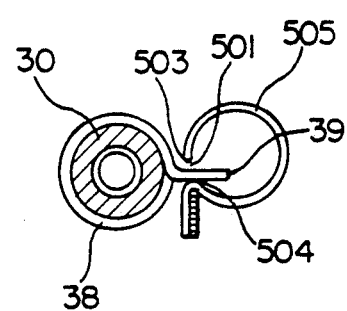

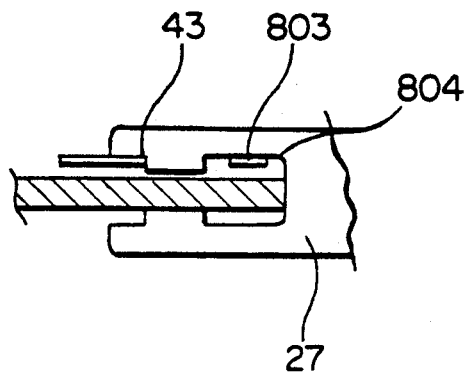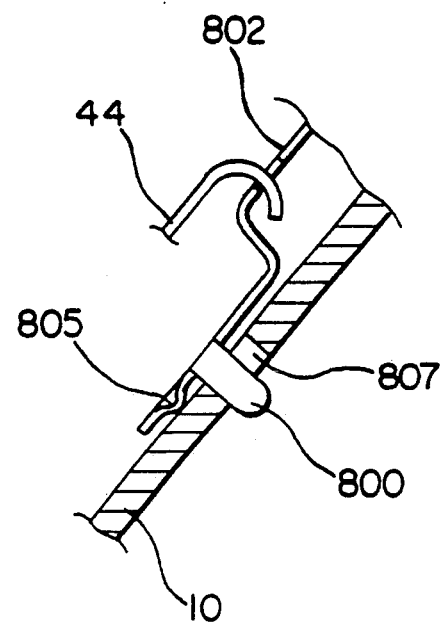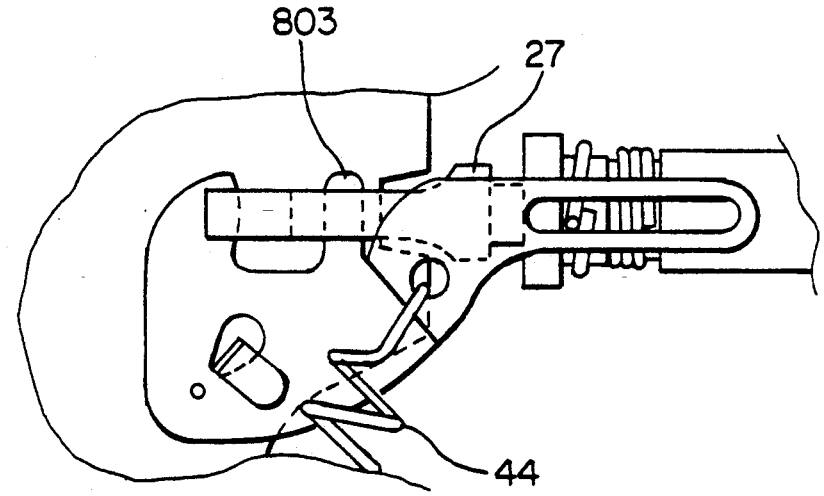

DEVICE FOR AUTOMATICALLY TAKING UP PLAY FOR A BRAKING MECHANISM

The invention relates to a device for automatically taking up play, able especially to equip a drum brake of the type of those comprising a pair of shoes in the shape of a circular arc capable of moving away from each other under the action of control means by foot and/or by hand, and in which these shoes are stressed towards each other by a return spring, this device comprising:

a strut of variable length, on which the shoes come to bear, and which itself comprises a threaded rod being guided in a tubular part and bearing on the latter by the intermediary of a cylindrical piece, the increase in length of the strut being obtained by the rotation of the cylindrical piece and taking up the play; and a control member driven pivotably alternately in a first direction and in a second direction opposite to the first, this member acting on the cylindrical piece by the intermediary of a spring-wire wound onto this piece, the pivoting of the control member in the first direction engendering a tightening of the spring-wire on the cylindrical piece and correspondingly the driving of the latter by friction, while the pivoting of the control member in the second direction engenders the release of the spring-wire and correspondingly its disengagement with respect to the cylindrical piece.

A device of this type is for example described in U.S. Pat. No. 4,515,250.

Two major objectives govern, in a general fashion, the design of devices for automatically taking up play, namely simplicity of manufacture and reliability of operation.

The object of the present invention is to provide a new device suitable for satisfying these two objectives, and achieves this by providing that said pivoting control member is an elbowed lever, with two arms, which is articulated at its elbowed zone on one of said shoes, one of the arms of the lever acting on the spring-wire and the other bearing on one of the ends of said strut, and in that an elastic means permanently stresses the elbowed lever so that it applies itself against this end, the force of said elastic means not permitting the action of said return spring to be countered but being sufficient to drive the cylindrical piece.

This device can comprise, moreover, thermosensitive means capable of reducing the tightening effort of said spring-wire on the cylindrical piece under the effect of heat, thus ensuring its automatic disengagement above a certain temperature.

For example, the thermosensitive means comprise a substantially circular, but not closed, bimetallic strip which surrounds both said cylindrical piece and said spring-wire and of which the ends are connected to the ends of the spring-wire, so that a rise in temperature engenders the release of the latter.

According to an advantageous embodiment, said pivoting control member is an elbowed lever of which one end has a slit in which one of the ends of the spring-wire is engaged, which end is radially bent over towards the outside, the slit extending longitudinally in parallel with an axial direction (x—x') of the cylindrical piece, which allows the axial translation of the latter.

The slit concerned is preferably constituted by the opening separating the two edges of a curved bimetallic strip carried by the elbowed lever and shaped in such a fashion that the width of this slit increases under the effect of heat, thus providing, in the transmission of movement between the lever and the spring-wire, a play which is an increasing function of temperature.

The device of the invention can finally be characterized in that it equips a disk brake having a hand brake of which the actuating piston is securely fastened to a coaxial control rod guided in a caliper, in that this rod has a threaded end part by which it is screwed in a threaded hole provided in the piston, the displacement of the rod with respect to the caliper in the return direction taking up the play, and in that said cylindrical piece is a ring securely fastened to said rod.

The invention will now be described by way of an example with reference to the accompanying drawings in which:

FIG. 3 is an enlargement of a part of FIG. 1;

FIG. 4 is a sectional view made along the line 4—4 of FIG. 1;

FIG. 5 is a detailed view of a part of the device;

FIG. 6 is a partial sectional view of the device of the invention taken along view line 6—6 of FIG. 7;

FIG. 7 is a sectional view along the line 7—7 of FIG. 6;

FIG. 8 is similar to FIG. 3 but relates to another embodiment;

FIG. 9 is similar to FIG. 8 but relates to another embodiment;

FIG. 10 is a sectional view along the line 10—10 of FIG. 9;

FIGS. 11 to 13 illustrate another embodiment of the elbowed lever used in the device of the invention;

Figure 1:
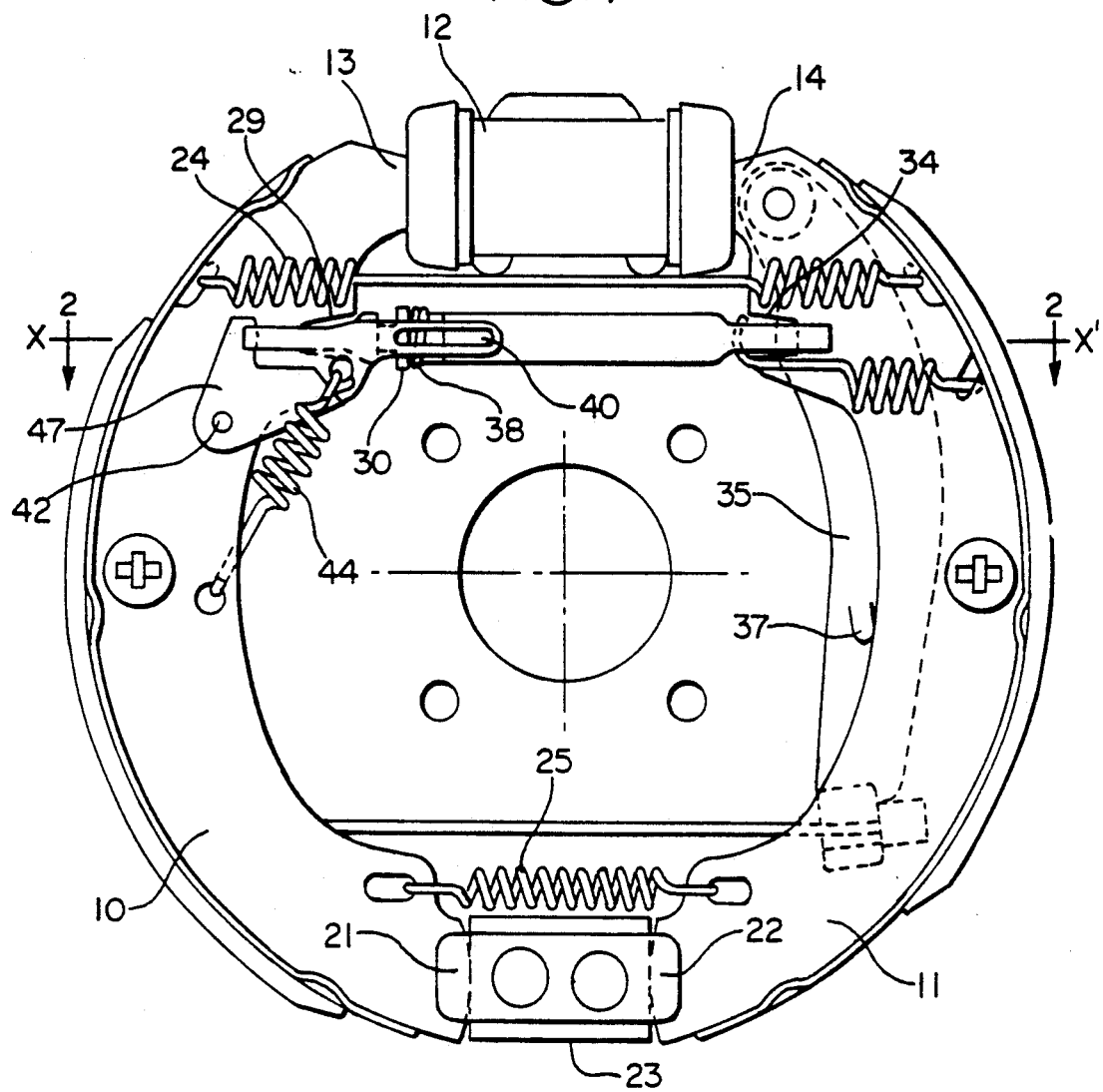
FIG. 1 is a front view of a drum brake using the device of the invention.
Figure 2:
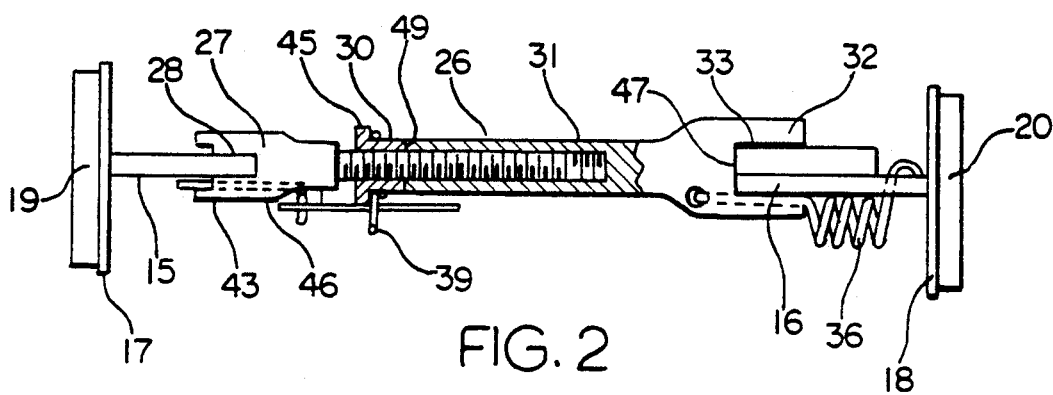
FIG. 2 is a sectional view made along the line 2—2 of FIG. 1.

The drum brake represented in FIGS. 1 and 2 comprises a support, not shown, provided to be associated with the wheel bracket of the vehicle and on which are received, in a slidable fashion, two brake shoes 10 and 11. Spacing means constituted, in the embodiment represented, by a wheel-brake cylinder 12 are arranged between the first two ends 13 and 14 of the shoes which comprise a flat web 15 and 16 and a rim 17 and 18 on which is fixed a friction lining 19 and 20; the other two ends 21 and 22 bearing against an anchoring block 23 securely fastened to the support phase.

Traction springs 24 and 25 arranged in the vicinity of the wheel-brake cylinder 12 and of the anchoring block 23 respectively maintain the ends 13, 14, and 21, 22 against the wheel-brake cylinder and the anchoring block. This brake comprises, moreover, a strut which, placed between the shoes, is composed of a threaded rod 26 flattened at one end 27 which comprises a U-shaped slot 28 engaged in a slot 29 made in the shoe 10, the other threaded end receiving a nut 30 and being guided in a tubular piece 31 flattened at one end 32. This end comprises a U-shaped slot 33 which is engaged in a slot 34 made in the shoe 11. A traction spring 36 hooked, on the one hand, to the tubular piece and to the shoe 11 maintains said tubular piece so as to bear against the hand brake lever 35 and the stop 37 of said lever so as to bear on the web of the shoe 11.

Onto the nut 30 a spring-wire 38 is rolled, of which one end is free and the other 39 is engaged in the slit 40 of one of the arms of an elbowed lever 41 comprising two arms and pivoting, in its elbowed zone, on a pin 42 securely fastened to the shoe 10, the other arm of the lever being maintained, in a slot 43, against the flattened end of the threaded rod 26 by a traction spring 44 hooked to the arm of the elbowed lever carrying the slit 40 and to the shoe carrying the pin 41.

This traction spring 44 is hooked under the web 15 in order to maintain the arm carrying the slit 40 of the elbowed lever against the outer surface 45 of the nut 30.

The brake described above operates in the following manner.

At rest, the spring 24 stresses the shoes towards each other against the ends 46 and 47 of the strut, by the intermediary of the hand brake 35 for the end 47. Under the effect of pressure, the wheel-brake cylinder moves apart the ends 13 and 14 of the shoes so that the friction linings 19 and 20 come into contact with the drum. Simultaneously the flattened end of the threaded rod distances itself from the shoe under the effect of the spring 44 which acts by the intermediary of the elbowed lever 41. If the play is insufficient between the end 39 of the spring-wire and the edges of the slit of the elbowed lever, said lever, pivoting on its pin 42, drives the nut 30 by a fraction of a revolution, by friction, by the intermediary of the spring-wire 38 which, in this direction of mounting, tightens on the nut, thus increasing the length of the strut and taking up the play.

When the pressure in the wheel-brake cylinder ceases, the spring 24 returns the shoes so as to bear against the ends 46 and 47 of the strut and simultaneously the flattened end of the threaded rod pushes back the elbowed lever which pivots on its pin in the opposite "return" direction and drives, via its slit, the end of the spring-wire which, in this direction of mounting, releases itself from the nut and turns on the latter. Said nut is immobilized rotatably in the return direction by the friction of its face 49 on the tubular piece. As soon as the play between the drum and the friction linings allows a flapping of the elbowed lever which is greater than the play between the edges of the slit of the elbowed lever and the end of the spring-wire, the spring-wire drives the nut and thus takes up the play in step with wear, this being done in a virtually continuous manner.

In a second embodiment represented by FIGS. 3 and 4, this take-up device is equipped with a means for blocking the nut acting in the return direction. This system comprises a second so-called non-return spring wire 101, rolled around the nut 102 of which the end 103 is maintained virtually without play in the slit 104 of the blade 105 securely fastened to the shoe carrying the pin of the elbowed lever.

In the direction of mounting retained, the non-return spring-wire 102 blocks the nut when the elbowed lever stresses the spring-wire in the return direction, thus eliminating the risk of backwards and forwards movement of the nut if the friction of the latter on the tubular piece is not sufficient.

In a third embodiment represented in FIG. 5, the spring-wire 201 and, if necessary, the non-return spring 202 engage(s) in (a) groove(s) of "V"-shaped cross section 203 formed in the wall of the cylindrical piece 204; this arrangement permits very small movements of the spring-wire(s) to be obtained on the cylindrical piece (0.03 mm) and consequently a more precise adjustment, as a function of the thread pitch and of the lever ratio of the elbowed lever.

In a fourth embodiment represented in FIGS. 6 and 7, the take-up device is equipped with a thermosensitive means preventing adjustment in the event of the brakes overheating, an overheating which expands the drum and causes the play between the drum and the friction linings to be temporarily increased in an abnormal fashion.

Said thermosensitive means is a bimetallic strip 301, not closed, surrounding the cylindrical piece and the spring-wire 300 of which the ends 302 and 303, radially bent over towards the outside, engage in holes made in the ends 305 and 306 of said bimetallic strip.

Beyond a specified temperature said bimetallic strip moves apart the ends 302 and 303 of the spring-wire, thus ensuring its disengagement from the nut 304 and in this way preventing the driving of said nut and hence the adjustment during the overheat period.

In a fifth embodiment represented in FIG. 8, the edges 401 and 402 of the slit 403 of the elbowed lever 404 are slightly convergent on the side of the pivoting axis, ensuring a constant play, between the friction linings and the drum, during all the wear of said friction linings.

In a sixth embodiment represented in FIGS. 9 and 10, the slit 501 of the elbowed lever 502 is constituted by the opening separating the two edges 503 and 504 of a curved bimetallic strip 505 carried by the elbowed lever and shaped in such a fashion that the width of the slit increases under the effect of heat, and possibly these edges can be slightly convergent according to the sixth embodiment.

This embodiment thus provides, in the transmission of movement between the lever and the spring-wire, a play which is an increasing function of the ambient temperature of the brake, avoiding underadjustment, due to prolonged intensive use, whilst at the same time permitting a virtually constant play, between the friction linings and the drum, for a given temperature.

In a seventh embodiment, represented in FIGS. 11 to 13, the pin 42 securely fastened to the web of the shoe 10 is replaced by a tab 800 cut out in the lever 802 and bent over at 90°. This tab, bearing against the surface of revolution of a hole 801 pierced in the web, serves as a pivoting pin for the lever.

A second tab 803 made in the lever and engaged in the opening 804 of the screw 27 prevents the lever from distancing itself from the web under the action of the traction spring 44.

A peg 805 encased in the elbowed lever limits the contact surface of the latter on the web.

Stressed by the spring, the elbowed lever is held in place by:

the bent-over tab 800 engaged in the hole 801 (this hole can be shaped in order to limit the flapping of the pivoting pin), the encased peg 805 bearing on the web.

The arm of the lever bearing on the end 43 of the screw 27.

The second tab 803 engaged in the opening 804 of the screw 27.

Figure 14:
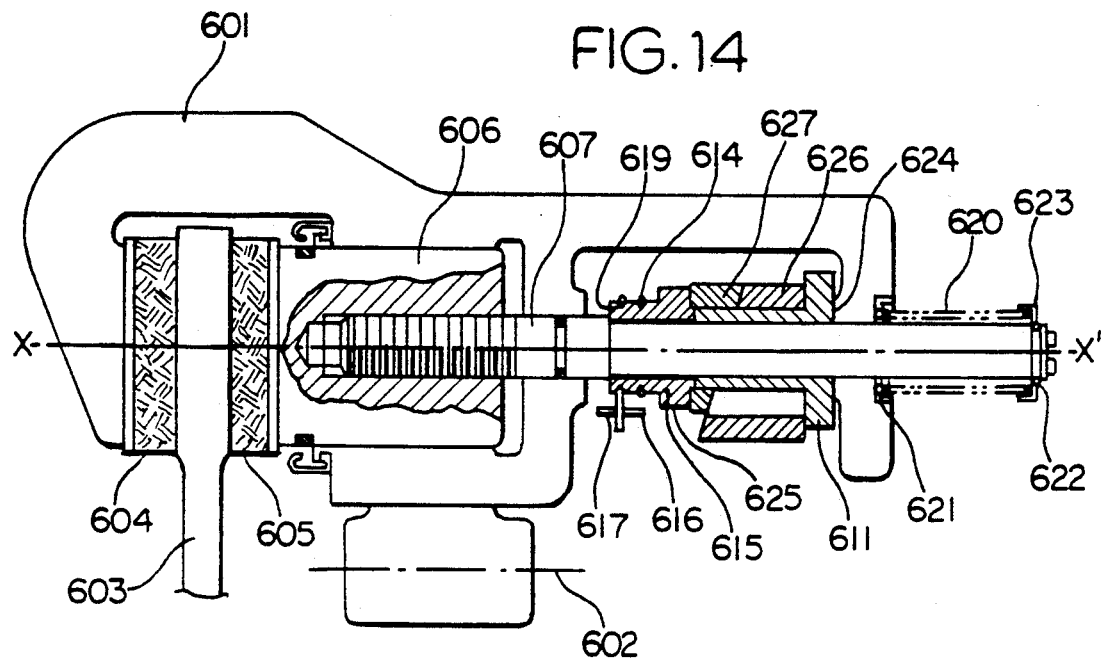
FIG. 14 represents the application of the device of the invention to a disk brake as seen from the direction of view line 14—14 of FIG. 15.
Figure 15:
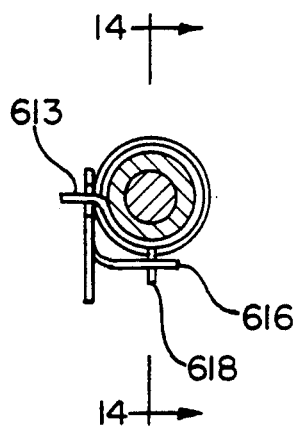
FIG. 15 is a partial sectional view of this device taken along view line 15—15 of FIG. 16.
Figure 16:
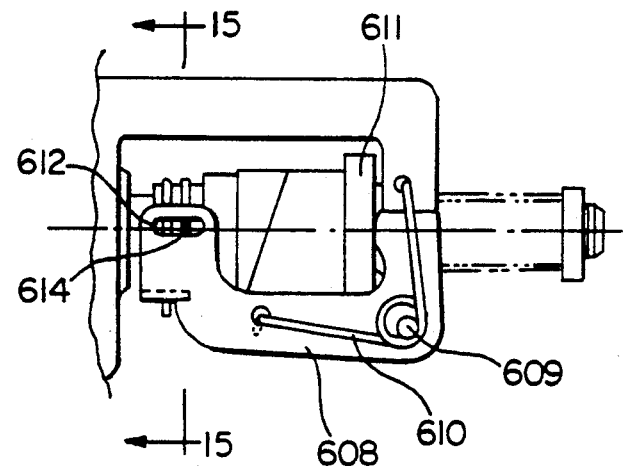
FIG. 16 is a side view of this device.

The disk brake partially represented in FIGS. 14, 15 and 16 comprises a caliper 601 sliding on an axis 602 securely fastened to the wheel bracket of the vehicle and overlapping a disk 603, securely fastened to the wheel axle, clamped between two friction linings 604 and 605 by the hydraulic pressure of the braking circuit exerted on the piston 606. Said piston is securely fastened to a coaxial control rod 607 of which one end is screwed in a threaded hole provided in the piston (for the drawing represented the threading is left-handed).

An elbowed lever 608 with two arms, articulated in the elbowed zone on a pin 609, securely fastened to the caliper, and stressed by a spring 610 bears by one of these arms against a ring 611 turning freely about the control rod 607. The second arm has a slit 612 in which there is engaged one end 613, which is radially bent over towards the outside, of a spring-wire 614 rolled around a ring 615 in a groove of "IV"-shaped profile. The ring 615 is securely fastened to the control rod. This second arm has a bent-over part 616 which has a second slit 617 in which there is engaged virtually without play the end 618, which is bent over radially, of a second so-called non-return spring-wire 619 rolled also around the ring 615 in a groove of "V"-shaped profile and in the same direction as the spring-wire 614. A compression spring 620 bearing on one side on the body of the caliper by the intermediary of a thrust ball bearing 621 and on the other side against a stop composed of a snap ring 622, housed in a groove made at the non-threaded end of the control rod, and of a washer 623 applies the ring 611, by the intermediary of the ring 615 and of the control rod, against the bearing surface 624 of the caliper.

The spring 610 is mounted and constrained in such a fashion that it maintains the elbowed lever so as to bear on the outer surface 625 of the ring 615.

A spacing assembly, composed of a lever 626, represented partially, and of a sloped ring 627, placed between the rings 615 and 611 transmits the effort exerted on the hand brake to the piston by the intermediary of the control rod.

The device for taking up play equipping the disk brake described above operates in the following manner:

Under the effect of hydraulic pressure the piston 606 drives the control rod 607 by the intermediary of the threading.

Simultaneously the elbowed lever 608 stressed by the spring 610, on the one hand presses, pivoting, the ring 611 and the spacing assembly against the ring 615, and on the other hand, after having taken up the play between the end 613 of the spring-wire and the edges of the slit 612 of the elbowed lever, drives said spring-wire which, in the direction of mounting retained, releases itself from the ring 615 and turns on the latter.

Said ring 615 is maintained in rotation by the non-return spring-wire 619 of which the end is maintained in the slit 617 of the bent-over part of the elbowed lever. This slit, flapping in the same plane as the axis of the control rod, maintains the end of the non-return spring-wire in position.

When the pressure on the piston ceases, the spring 620 returns the ring 611 against the bearing face 624 of the caliper by the intermediary of the control rod and of the spacer assembly, and simultaneously by the intermediary of said ring 611 causes the elbowed lever to pivot on its pin. In pivoting, the elbowed lever, by the intermediary of the spring-wire which tightens on the ring 615, drives said ring by a fraction of a revolution, thus taking up the play.

I claim:

1. A device for automatically taking up play in a drum brake comprising a pair of shoes in the shape of a circular arc capable of moving away from each other under the action of control means, and in which the shoes are stressed toward each other by a return spring, the device comprising:

a strut of variable length, on which the shoes come to bear, and which comprises a threaded rod guided in a tubular part and bearing on the tubular part by the intermediary of a cylindrical piece, an increase in length of the strut being obtained by rotation of the cylindrical piece and taking up the play; and a pivoting control member driven pivotably alternately in a first direction and in a second direction opposite to the first direction, the control member acting on the cylindrical piece by the intermediary of a spring-wire rolled around the piece, the pivoting of the control member in the first direction effecting a tightening of the spring-wire on the cylindrical piece and correspondingly a driving of the cylindrical piece by friction, while pivoting of the control member in the second direction effects a release of the spring-wire and correspondingly disengagement with respect to the cylindrical piece, characterized in that said pivoting control member is an elbowed lever with two arms, which is articulated at an elbowed zone on one of said shoes, one of the arms of the lever acting on the spring-wire and the other arm bearing on one end of said strut, elastic means stressing permanently the elbowed lever so that the lever applies against the end, the force of said elastic means not permitting the action of said return spring to be countered but being sufficient to drive the cylindrical piece, one end of said control member having a slit in which one end of the spring-wire is engaged and radially bent over toward the outside, the slit extending longitudinally in parallel with an axis of the cylindrical piece, which allows axial translation of the piece, and said slit constituted by an opening separating two edges of a curved bimetallic strip carried by the elbowed lever and shaped so that the width of the slit increases under the effect of heat, thus providing, in the transmission of movement between the lever and the spring-wire, a play which increases as a function of temperature.

2. The device according to claim 1, characterized in that the edges of said slit are slightly convergent on a side of a pivoting axis of the elbowed lever.

* * * * *